(12) United States Patent
Chapman

(10) Patent No.: US 6,363,442 B1
(45) Date of Patent: Mar. 26, 2002

(54) SYSTEM FOR MODIFYING DATA READ OUT FROM STORAGE DEVICE AND ONLY OVERWRITING THOSE COMPONENTS OF THE DATA READ OUT WHICH DIFFER FROM THE MODIFIED DATA

(75) Inventor: Michael Chapman, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/199,849

(22) Filed: Nov. 25, 1998

(30) Foreign Application Priority Data

Nov. 26, 1997 (DE) .......................... 197 52 422

(51) Int. Cl.$^7$ .............................. G06F 13/14
(52) U.S. Cl. .............. 710/62; 710/11; 710/64; 711/104
(58) Field of Search .............. 710/62, 11, 64; 711/104

(56) References Cited

U.S. PATENT DOCUMENTS

| 4,155,071 A | * | 5/1979 | Shamburger | .............. 340/146.2 |
|---|---|---|---|---|
| 5,051,947 A | * | 9/1991 | Messenger et al. | ............. 707/3 |
| 5,483,566 A | * | 1/1996 | O'Hara, Jr. et al. | ........... 377/73 |
| 5,745,911 A | * | 4/1998 | Sugiyama | .................... 707/533 |
| 5,805,931 A | * | 9/1998 | Morzano et al. | ............... 710/64 |
| 5,996,032 A | * | 11/1999 | Baker | ........................... 710/62 |
| 6,085,283 A | * | 7/2000 | Toda | ........................... 711/104 |
| 6,094,443 A | * | 7/2000 | Dwork | ....................... 370/510 |

FOREIGN PATENT DOCUMENTS

DE 239684 A1 10/1986

* cited by examiner

Primary Examiner—Thomas Lee
Assistant Examiner—Abdelmoniem Elamin
(74) Attorney, Agent, or Firm—Herbert L. Lerner; Laurence A. Greenberg; Werner H. Stemer

(57) ABSTRACT

The method and apparatus described are distinguished in that the data read out and the modified data are compared with one another before the data read out are overwritten with the modified data. Only those components of the data read out which differ from the modified data are overwritten. This is an extremely simple way of preventing changes to the stored data that were made between the time of reading out the data and overwriting the data from being unintentionally reversed.

9 Claims, 1 Drawing Sheet

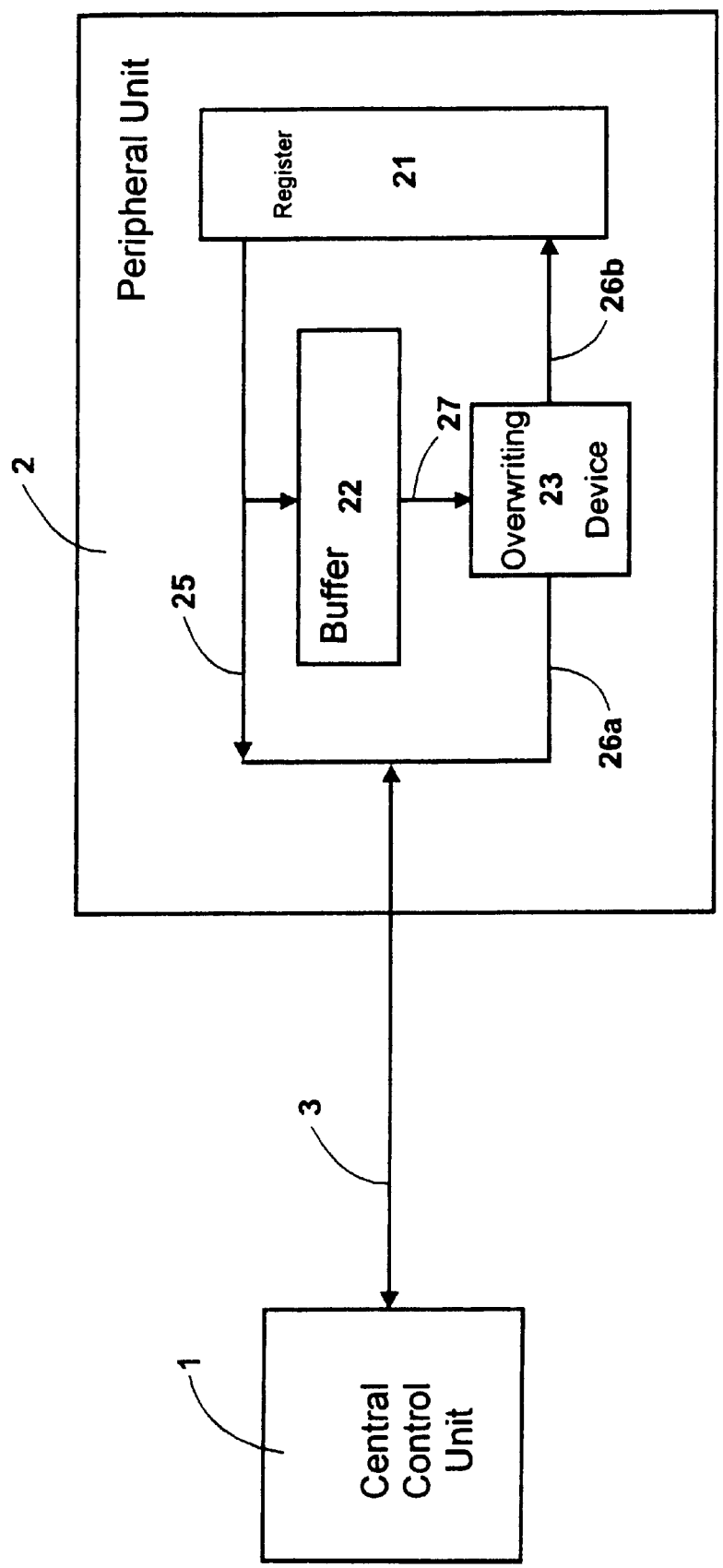

SYSTEM FOR MODIFYING DATA READ OUT FROM STORAGE DEVICE AND ONLY OVERWRITING THOSE COMPONENTS OF THE DATA READ OUT WHICH DIFFER FROM THE MODIFIED DATA

BACKGROUND OF THE INVENTION

Field of the Invention

The present invention relates to a method and an apparatus for reading out data stored in a storage device, modifying the data and overwriting the data read out with the modified data.

Such methods and apparatus are known and require no further explanation. The storage device may, by way of example, but obviously not exclusively, be registers of devices that can be used as peripheral units of central control units. The central control units are, for example, microprocessors, microcontrollers, signal processors etc. The peripheral units may, for example, be timers, external storage media, and other devices that can be driven by the central control unit. At least some of the registers provided in the peripheral units may be used to frequently change the particular states or operating modes of the peripheral units, or to influence their behavior in some other way. If this is to be done, the content of the relevant register(s) needs to be changed accordingly. To change the register content, it is read out, transferred to the control unit, modified there, then transferred back to the peripheral unit and finally stored in the register (overwriting completely the previous register content) again. Although it is frequently sufficient to change just one or a few bits of the register content in order to achieve the desired effect. For the sake of simplicity (uniformity) the above-mentioned steps usually relate to the entire register content or at least units (words) of the register that include a plurality of bits.

Although such a change to the register content is fast and simple to perform, it is not quite without problems because, after all, not only are those bits of the register content which are to be modified overwritten, but also those bits which are not intended to be modified. Admittedly, it is no trouble at all to overwrite the bits which are not to be modified with the exact values which were read out beforehand, but this does not guarantee that only those bits of the register content which are to be modified are changed. Specifically, if the register content has changed (at the instigation of the peripheral unit itself or of any other devices, for example) between having been read out and having been overwritten, then the bits of the register content which are not to be modified would not be overwritten with the values which they currently hold.

This is naturally a disadvantage that needs to be overcome. One possibility of preventing the above-mentioned effect is for the control unit to inform the peripheral unit (by transmitting a mask, for example) which bits of the register content are affected by the modification performed, and for the peripheral unit then to overwrite only these specific bits in the relevant register. However, transmitting such information involves considerable additional outlay, and is not possible at all in many systems.

SUMMARY OF THE INVENTION

It is accordingly an object of the invention to provide a method and apparatus for reading out, modifying and overwriting data stored in a storage device which overcome the above-mentioned disadvantages of the prior art methods and devices of this general type, in which changes to the data stored in the storage device which were made between reading out and overwriting can be reliably prevented from being unintentionally reversed.

With the foregoing and other objects in view there is provided, in accordance with the invention, in an improved method for reading out data stored in a storage device, modifying the data by forming modified data and overwriting the data read out with the modified data, the improvement which includes: comparing the data read out and the modified data with one another before the data read out are overwritten with the modified data, and only those components of the data read out differing from the modified data are overwritten in the storage device.

Accordingly, it is provided that the data read out and the modified data are compared with one another before the data read out are overwritten with the modified data, and only those components of the data read out which differ from the modified data are overwritten. In addition, an overwriting device is provided which is configured to compare the data read out and the modified data with one another before the data read out are overwritten with the modified data, and to overwrite only those components of the data read out which differ from the modified data.

As a result of the comparison between the data read out and the modified data, the unit containing the storage device is able to establish, without any corresponding information from the unit performing the modification, which components of the data have been changed as a result of the modification. Overwriting only those parts of the storage device that have been changed as a result of the modification leaves those parts of the storage device not affected by the modification unchanged. Changes to the data stored in the storage device that are made between reading out and overwriting cannot therefore be reversed unintentionally.

In accordance with an added feature of the invention, there is the step of writing the data read out to a buffer storage device immediately after being read out, and comparing the modified data with the data stored in the buffer storage device during the comparing step.

In accordance with another feature of the invention, there is the step of modifying the data read out by a data modifying device separate from a peripheral unit containing the storage device and an overwriting device for overwriting the data read out.

With the foregoing and other objects in view there is also provided, in accordance with the invention, in combination with a storage device, an apparatus for reading out data stored in the storage device, modifying the data resulting in modified data and overwriting the data read out with the modified data, including: an overwriting device receiving the data read out of the storage device and the modified data for comparing the data read out with the modified data before the data read out are overwritten with the modified data, and to overwrite only those components of the data read out which differ from the modified data.

In accordance with an added feature of the invention, there is a central control unit for modifying the read out data into the modified data, the storage device and the overwriting device forming constituent parts of a peripheral unit controlled by the central control unit.

In accordance with another feature of the invention, the peripheral unit and the central control unit are separate devices.

In accordance with an additional feature of the invention, the central control unit controls the storage device and the overwriting device.

In accordance with a further added feature of the invention, the peripheral device has a buffer storage device receiving the read out data from the storage device and temporarily storing the data read out.

In accordance with a concomitant feature of the invention, the storage device has bit positions for storing the data and the overwriting device overwrites one or more selected bit positions of the storage device. Other features which are considered as characteristic for the invention are set forth in the appended claims.

Although the invention is illustrated and described herein as embodied in a method and apparatus for reading out, modifying and overwriting data stored in a storage device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, block diagram of a structure of a configuration that contains an apparatus suitable for carrying out the method according to the invention.

DESCRIPTION OF THE PREFERRED EMBODIMENTS

Referring now to the single FIGURE of the drawing in detail, there is shown a configuration including a central control unit 1 in the form of a microcontroller 1, and a peripheral unit 2 connected to the latter via a connection line 3 configured for bidirectional data transfers.

In place of the microcontroller 1, it is also possible for a different control unit, for example a microprocessor or a signal processor, to be used. The peripheral unit 2 connected to the central control unit 1 may be any peripheral unit which can be connected to the relevant unit, for example a timer, an external storage unit or an apparatus which is to be controlled by the central control unit 1.

The peripheral unit 2 contains a storage device in the form of a register 21, a buffer storage device 22 and an overwriting device 23.

Suppose that data including a multiplicity of bits (for example 16 bits) are stored in the register 21. The data stored in the register 21 are of arbitrary significance or use. In the example under consideration, the register 21 is assumed to be a so-called special function register whose content is interpreted as control instructions for driving the peripheral unit 2.

The content of the register 21 can be changed at the instigation of the microcontroller 1. Hence, the microcontroller 1 is capable of controlling the peripheral unit 2 by modifying the register content (in a manner described in more precise detail below). Alternatively, the content of the register 21 may be changed at the instigation of any other devices (for example by other control units or the peripheral unit 2 itself).

If the microcontroller 1 wishes to change the content of the register 21, then it gives instructions for the following steps to be executed:

1) reading out the data stored in the register 21,
2) a) writing the data read out to the buffer storage device 22, and
2) b) transferring the data read out to the microcontroller 1 via a read line 25 and the connection line 3,
3) modifying the data received (in the microcontroller 1),
4) transferring the modified data to the peripheral unit 2 via the connection line 3, and
5) overwriting the data stored in the register 21 with the modified data, but overwriting only those parts of the register which have been changed in the course of modification in the microcontroller 1.

Reading out the register content (step 1), writing the data read out to the buffer storage device 22 and transferring the data read out from the peripheral unit 2 to the microcontroller 1 (step 2), and transferring the modified data from the microcontroller to the peripheral unit (step 4) are done in units which include a number of bits, for example in units having 16 bits (16-bit words), where such a unit may include the entire register content or only parts of it.

The microcontroller 1 may be prompted, by appropriate instructions, to set arbitrarily selectable bits within the data word received to specific values. This enables modification of the register content to be restricted, irrespective of the size of the units in which it is handled, to those bits that have been specified as needing to be adjusted (to be set or reset). The bits are modified in a predetermined manner in order to achieve the desired effect (the desired driving). The bits that are not affected by the adjustment are not changed as a result of the register content being modified (step 3), that is to say that (in step 4) they are transferred back unchanged to the peripheral unit.

The modified data transferred from the microcontroller 1 to the peripheral unit 2 are passed via a write line section 26a to the overwriting device 23, where they are initially compared bit by bit with the data that are stored in the buffer storage device 22 and now output via the line 27.

The data stored in the buffer storage device 22 are the data read out of the register 21 in step 1. They were written to the buffer storage device 22 in step 2 as already mentioned above.

Hence, when the data transferred from the microcontroller 1 to the peripheral unit 2 are compared with the data stored in the buffer storage device 22, the data modified by the microcontroller 1 are compared with the data read out beforehand from the register 21, i.e. data which have not yet been modified. This establishes which components (bits) of the original register content have been changed as a result of the modification in the microcontroller 1.

The information is used to the effect that only those bits from the register 21 are overwritten in step 5 (via the write line section 26b) which have changed as a result of the modification of the register content in step 3.

In this instance, the individual bits may be overwritten in successive overwriting procedures or using a mask generated on the basis of the comparison in the overwriting device. Since the method described involves overwriting only those bits of the register 21 which have changed as a result of the modification by the microcomputer 1, the remaining bits of the register content maintain their present state. Bits which were changed between reading the register content in step 1 and overwriting it in step 5 (by the peripheral unit or any other devices, for example) are not, unlike previously, returned to the state which they were in when the register content was read out. This means that it is not possible for the modification of the register content by the microcontroller 1 to result in any unintentional (disruptive) effect on the function and/or operation of the peripheral unit 2.

The above explanation assumes that a bit is the smallest cohesive unit that can be overwritten in the register 21. Although this is currently regarded as being the optimum, the invention is not limited to this. The smallest cohesive unit may also be an arbitrarily larger component of the register content, for example a byte of it.

It is preferable if the smallest cohesive unit when overwriting the register content corresponds to the units in which the modified register content and the register content read out beforehand are compared, but this is not an essential prerequisite for the subject matter described to function properly.

Irrespective of the details of their practical implementation, the method and apparatus described make it possible to prevent, by extremely simple devices, changes to the data stored in the storage device which were made between reading out and overwriting from being unintentionally reversed.

I claim:

1. In an improved method for reading out data stored in a storage device, modifying the data by forming modified data and overwriting the data read out with the modified data, the improvement which comprises:

comparing the data read out and the modified data with one another before the data read out are overwritten with the modified data, and only those components of the data read out differing from the modified data are overwritten in the storage device.

2. The method according to claim 1, which comprises writing the data read out to a buffer storage device immediately after being read out, and comparing the modified data with the data stored in the buffer storage device during the comparing step.

3. The method according to claim 1, which comprises modifying the data read out by a data modifying device separate from a peripheral unit containing the storage device and an overwriting device for overwriting the data read out.

4. In combination with a storage device, an apparatus for reading out data stored in the storage device, modifying the data resulting in modified data and overwriting the data read out with the modified data, comprising:

an overwriting device receiving the data read out of the storage device and the modified data for comparing the data read out with the modified data before the data read out are overwritten with the modified data, and to overwrite only those components of the data read out which differ from the modified data.

5. The apparatus according to claim 4, including a central control unit for modifying the data read out into the modified data, the storage device and said overwriting device forming constituent parts of a peripheral unit controlled by said central control unit.

6. The apparatus according to claim 5, wherein said peripheral unit and said central control unit are separate devices.

7. The apparatus according to claim 6, wherein said central control unit controls the storage device and said overwriting device.

8. The apparatus according to claim 4, wherein said peripheral device has a buffer storage device receiving the data read out from the storage device and temporarily storing the data.

9. The apparatus according to claim 4, wherein the storage device has bit positions for storing the data and said overwriting device overwrites one or more selected bit positions of the storage device.

* * * * *